(12) United States Patent
Tsuboi et al.

(10) Patent No.: US 6,326,708 B1
(45) Date of Patent: Dec. 4, 2001

(54) SLIDER UNIT WITH BUILT-IN MOVING-COIL LINEAR MOTOR

(75) Inventors: Takaaki Tsuboi; Norimitsu Kitade, both of Kanagawa-ken (JP)

(73) Assignee: Nippon Thompson Co., Ltd., Tokyo (JP)

(*) Notice: Subject to any disclaimer, the term of this patent is extended or adjusted under 35 U.S.C. 154(b) by 0 days.

(21) Appl. No.: 09/610,352

(22) Filed: Jul. 5, 2000

(30) Foreign Application Priority Data

Jul. 6, 1999 (JP) .................................................. 11-192365

(51) Int. Cl.[7] .................................................. H02K 41/00
(52) U.S. Cl. ................................. 310/12; 310/13; 310/14
(58) Field of Search .................................. 310/12, 13, 14, 310/17, 22, 23, 24, 258, 259, 179, 198; 318/135

(56) References Cited

U.S. PATENT DOCUMENTS

| | | | |
|---|---|---|---|
| 3,895,585 | * | 7/1975 | Schwarzler .................. 104/148 LM |
| 4,849,664 | * | 7/1989 | Miyazaki et al. ...................... 310/12 |
| 5,072,144 | * | 12/1991 | Saito ...................................... 310/12 |
| 5,134,324 | * | 7/1992 | Sakagami et al. ..................... 310/12 |
| 5,825,104 | * | 10/1998 | Kondo ................................... 310/12 |
| 6,140,734 | * | 10/2000 | Hazelton et al. .................... 310/198 |
| 6,163,091 | * | 12/2000 | Wasson et al. ........................ 310/12 |
| 6,191,507 | * | 2/2001 | Peltier et al. ......................... 310/12 |
| 6,239,516 | * | 5/2001 | Floresta et al. ....................... 310/12 |

FOREIGN PATENT DOCUMENTS

| | | |
|---|---|---|
| 38503/1994 | 2/1994 | (JP) . |
| 307445/1994 | 11/1994 | (JP) . |
| 140329/1996 | 5/1996 | (JP) . |
| 190431/1996 | 7/1996 | (JP) . |
| 290560/1998 | 10/1998 | (JP) . |

\* cited by examiner

*Primary Examiner*—Nestor Ramirez
*Assistant Examiner*—Thanh Lam
(74) *Attorney, Agent, or Firm*—Browdy and Neimark (57) ABSTRACT

A slider unit having built in a moving-coil linear motor is incorporated in a linear motion guide unit having a track rail and a slide. The slider unit is made easy in mounting to the appliances or works. The linear motion guide unit has the track rail and the slider movable lengthwise of the track rail. A linear motor is arranged between any one of widthwise opposing side walls of the track rail and the slider, and composed of a stator comprising a magnet yoke and field magnets, and a moving-coil assembly held on a side edge of a mount of the slider. The linear motor is preferred to make compact or slim in construction the linear motion guide unit, in which the linear motor is incorporated, thus making the slider unit simple in construction.

13 Claims, 11 Drawing Sheets

SLIDER UNIT WITH BUILT-IN MOVING-COIL LINEAR MOTOR

BACKGROUND OF THE INVENTION

1. Field of the Invention

The present invention relates to a slider unit that has been extensively used in semiconductor/liquid crystal display manufacturing apparatus, measuring instruments, assembling machines, machine tools, industrial robots, testing instruments, conveyors and others. More particularly it relates to a slider unit having a slider movable lengthwise along an elongated track rail and equipped with a built-in moving-coil linear motor.

2. Description of the Prior Art

The linear motion guide unit is typical of basic and general-purpose devices supporting a striking development in recently advanced mechatronics technology. Although the linear motion guide units have conventionally used incorporated in the apparatus of diverse technical fields, such as machine tools, semiconductor manufacturing machines, material-handling systems, testing instruments, measuring devices, processing machines, assembling machines, industrial robots and others, their use still grow increasingly with the development in technology. In addition, the linear motion guide units recently become required to meet with needs of high precision and high speed in operation, easy assembly, universal application, and so on.

Generally speaking, most linear motion guide units require any sliding means that are installed with the built-in driving means, compact or slim in construction, and able to operate with high propulsion, high speed and high response to provide high speed travel and accurate position control for works, tools, articles and appliances. Linear motors commonly built in the slider units involve two broad types. The first, called moving-magnet linear motor, has a stator of an armature coil arranged lengthwise over the entire length of a bed of stationary part, and a moving-field magnet of permanent magnet arranged on a table movable in a sliding manner along the length of the bed. The second, called moving-coil linear motor, has a stator of field magnet mounted on the bed, and moving-armature coils distributed in space one after another on the table such that they lie a preselected electrical angle out of phase.

A typical example of the prior slider units is composed of an elongated track rail having a U-shape in cross-section, a slider fitting in the U-shaped track rail for freely sliding movement lengthwise the track rail, and driving means to move the slider along the track rail. Japanese Patent Laid-Open No. 307445/1994 discloses a rolling guide unit, which comprises a track rail made in a U-shaped recess in cross-section and arranged in an ellipse, a platform fitting for sliding motion in the U-shaped recess of the track rail, and a motor to drive a pinion meshing with a rack provided on any one of sidewise opposing outside surfaces of the track rail, the motor being arranged on lugs extending sidewise outwardly of the platform. In the construction cited above, the motor projecting above the platform makes it tough to mount a work on the platform.

Another example of the prior slide units is an X-Y stage disclosed in, for instance, Japanese Patent Laid-Open No. 190431/1996. The X-Y stage has a sub-station of U-shape in cross section, a main station movable on the sub-station, and a moving-coil linear motor, or voice-coil linear motor, to drive linearly the main stage. The linear motor in this X-Y stage is also arranged on a base extending sidewise of the main stage, so that the base should requires a broad plane sufficient in area to accommodate both the main stage and linear motor.

A further another example of the conventional slide units is disclosed in, for instance, Japanese Patent Laid-Open No. 38503/1996. The slider unit is composed of a base having a recess of U-shape in cross section, a moving-coil polyphase brushless linear motor built in the base, and a work table movable in a sliding manner along guide rails arranged on sidewise opposing walls of the U-shaped base. In the moving-coil linear motor described just above, permanent magnets are arranged such that the poles on the magnets alternate lengthwise in polarity, and a moving element is arranged for lengthwise movement. The moving element is provided with polyphase coils exposed in a magnetic gap formed on surfaces of the permanent magnets, and field detecting means to control the conducting direction to the polyphase coils. The permanent magnets are arranged spaced apart, while another permanent magnets magnetized lengthwise are alternately arranged and fixed between any adjoining first permanent magnets such that any like polarity comes near on their surfaces, thereby providing a continuous row of permanent magnets. As the moving element in the linear motor travels along the guide rails arranged on the sidewise opposing raised walls of the U-shaped base, the slider unit increases in overall height.

Another example of the conventional slide units is disclosed in, for instance, Japanese Patent Laid-Open No. 140329/1996, which includes a stationary part made in a U-shape in cross section to provide sidewise opposing upright guide rails, a moving part having rollers running along the guide rails, and a moving-magnet linear motor mounted on an upper section of the moving part. According to the prior construction cited above, because of the linear motor arranged above the moving part, it is impossible to attach the works to the moving part. Thus, the construction makes very tough the integration of the works.

Japanese Patent Laid-Open No. 290560/1998 discloses another example of the prior slide units, which includes a pair of linear guides formed in a U-shape in cross section, and a moving-magnet linear motor comprised of stators arranged on the linear guides, each to each guide, and a moving magnet arranged at the center between the stators. As the linear guides are arranged on the stators, a broad plane is required for the stators.

Although the conventional slide units cited above have in general a track rail having an elongated recess of U-shape in cross section, a slider movable in a sliding manner in the recess of U-shape, and driving means to move the slider along the track rail, any of them has the major disadvantages of difficulty in mounting the works and of requiring much area or height for the stationary and moving parts.

Considering that the track rail used in the linear motion guide unit is recessed in cross section to provide high stiffness or rigidity, it will be expected to incorporate the linear motor to drive the slider into the linear motion guide unit, thus not only making the linear motion guide unit compact or slim in construction but also making possible to use the linear motor as the structural member. Moreover, the concept is awaited for making it much easy to mount the work onto the slider, improving in applicability to appliances of diverse fields and in handling of the work.

SUMMARY OF THE INVENTION

The present invention, therefore, has as its primary object to overcome the subject as described just above and to provide an improvement in a slider unit comprised of a track rail attached to a stationary bed, a slider mounted to a table movable relatively to the bed to travel in a sliding manner lengthwise of the track rail, and a built-in moving-coil linear motor to drive the slider to move with respect to the track rail. Especially, the present invention provides the slider unit with a built-in moving-coil linear motor, which has advantages of requiring no broad space or much height for accommodating the stator and moving element of the moving-coil linear motor, making it easy to mount the work onto the slider, fitting snugly in semiconductor manufacturing machines, testing instruments, measuring devices, processing machines, assembling machines and others, and also making it possible to accomplish accurate speed and position controls as well as high propulsion, high speed and high responsibility.

The present invention is concerned with a slider unit with a built-in moving-coil linear motor; comprising a track rail supported on a bed and having a pair of widthwise opposing side walls connected with one another, a slider mounted to a table movable with respect to the bed, the slider being movable in a lengthwise direction of the track rail in a sliding manner along a guide way defined between the widthwise opposing side walls of the track rail, and a moving-coil linear motor providing a driving power to move the slider relatively of the track rail; wherein the moving-coil linear motor is composed of a magnet yoke having a pair of field magnets and held on an outside surface of at least one side wall of the track rail, and a moving-coil assembly held on the slider and arranged in an air gap between the confronting field magnets to come into electromagnetic interaction with the field magnets, thereby producing a force to move the assembly along the lengthwise direction of the track rail.

The moving-coil linear motor constructed as described just above may generate an electromotive force in linear direction lengthwise of the track rail between the slider and track rail owing to the electromagnetic interaction between the field magnets on the magnet yoke, which is held on the outside surface of at least one side wall of the track rail, and the moving-coil assembly held on the slider and interposed in the air gap between the confronting field magnets, thereby allowing the table to move relatively of the stationary bed with high-speed and accurate position control. The magnet yoke, or the stator of the moving-coil linear motor, is held on the outside surface of at least one side wall of the track rail while the moving-coil assembly, or the rotor of the moving-coil linear motor is mounted on the slider. This construction makes it possible to incorporate the moving-coil linear motor without requiring large area and height into the linear motion guide unit having the track rail and slider, so that the linear motion guide unit may be made compact or slim in construction.

In accordance with an aspect of the present invention, a slider unit is disclosed wherein the track rail includes a bottom interconnecting the widthwise opposing side walls with one another to provide the guide way of U-shape in cross section, which is formed of the bottom in combination with the side walls. Moreover, the track rail is provided at the bottom thereof with holes in which fixing bolts fit to mount the track rail to the bed. According to the construction recited above, the track rail, as made in the U-shape in cross section, has the stiffness or rigidity enough to withstand bending or twisting and therefore this type of the track rail may be used as any structural member of the machinery or apparatus in which the slider unit is applied. The construction in which the track rail is fixed to the bed at its bottom of U-shaped cross section contributes to making the joining construction simple.

Although both the table and the moving-coil assembly are secured to the slider through the mount, they may be also fixed directly to the slider.

In accordance with another aspect of the present invention, a slider unit is disclosed wherein the slider is movable in a sliding manner along the track rail by virtue of rolling elements, which run through raceways defined between first raceway grooves made lengthwise on inwardly opposing inside surfaces of the confronting side walls of the track rail and second raceway grooves made on the slider in opposition to the first raceway grooves. The prior well-known linear motion guide unit may be well used for the constructions of the slider and the rolling guide mechanism having the combination of the raceway grooves with the rolling elements.

In accordance with another aspect of the present invention, a slider unit is disclosed wherein end blocks are arranged on lengthwise opposing ends of the track rail, each to each end, the end blocks being formed at the outermost end faces thereof with recesses for manipulation to make it possible to manually operate the slider unit. The slider unit, as entirely made in the elongated flat form, may be easily moved and/or carried by putting the operator's hands on the recesses formed at the outermost end faces of the end plates.

In accordance with a further another aspect of the present invention, a slider unit is disclosed wherein the magnet yoke is comprised of a pair of confronting webs that are provided on inwardly opposing surfaces thereof with the field magnets, each to each web, and a connecting web to join the confronting webs together at their bottom sides, and wherein the magnetic yoke is secured to the track rail, with an opening between the confronting webs being upwards. The field magnets are magnetized such that poles on the field magnets alternate in polarity lengthwise of the track rail and also unlike poles confront each other across the air gap between the field magnets. The stationary part or stator of the moving-coil linear motor is constructed such that the magnet yoke having a pair of confronting webs integrally joined together along their lower edges is attached to the track rail, with the air gap defined between the confronting webs opening upwards, and the field magnets are arranged in opposition to each other on the inwardly opposing surfaces of the webs. This construction makes it possible to arrange the webs closer to each other, thus contributing to making the slider unit compact or slim in structure.

In accordance with another aspect of the present invention, a slider unit is disclosed wherein the moving-coil assembly is held on either the slider extending beyond any one of the side walls of the track rail, on which the magnet yoke is secured, or a protrusion of the mount in such a relation that the assembly extends into the air gap between the confronting field magnets following passing through the opening of the magnet yoke. The moving-coil assembly, as held on the protrusion extending beyond any one side wall of the track rail from either the slider or the mount, may be made compact or slim in construction as well as easy in fitting operation.

In accordance with another aspect of the present invention, a slider unit is disclosed wherein the moving-coil assembly is comprised of a coil board held on an edge of the protrusion and arranged in the air gap, and a polyphase armature coil arranged on the coil board, the armature coil being composed of a core member of molded resinous material and winding turns looped around the core member in the form of flat rectangular solid, and wherein the armature coil is fixed to the coil board by engagement of a convexity formed on the core member with a recess on the coil board.

As the armature coil is made in the flat form, the moving-coil assembly may be reduced in thickness to the sum of the coil board and armature coil in thickness. This makes it possible to arrange the moving-coil assembly so as to extend in the air gap defined between the confronting field magnets in the magnet yoke. Correspondingly, the linear motor installed on the side wall of the track rail is also made reduced in thickness or width across the slit defined between the confronting field magnets whereby the slider unit is made much more compact or slim in construction. Engagement of any convexity of the armature coil with a recess of the coil board helps ensure the secure fit of the armature coil to the coil board so that there is no possibility of causing the out-of-place between the armature coil and the coil board even under high-speed operation of the table. The armature coil, though adhered to the coil board with adhesive, is molded with resinous material and, therefore, is less subject to deformation due to high temperature. This results in improving the structural strength of the armature coil, thereby allowing higher-speed of operation than any other prior slider units.

In accordance with another aspect of the present invention, a slider unit is disclosed wherein sensing means to monitor positions of the slider relatively of the track rail is comprised of a linear scale, and a sensor head to detect the linear scale, the linear scale being arranged on a top face of any one side wall of the track rail, on which the moving-coil linear motor is arranged, and sensor head is held on either the slider or the protrusion of the mount.

In accordance with a further another aspect of the present invention, a slider unit is disclosed wherein the moving-coil linear motor is shielded with a cover attached to the magnet yoke. The cover shielding the moving-coil linear motor closes the upward opening of the magnet yoke to keep the magnet yoke and the moving-coil assembly against foreign matter such as dust and dirt. Moreover, the protrusion on which the moving-coil assembly is held is offset downwards so that its upper surface is placed below an upper surface of either the slider or the mount on which the table is held, so that the cover extends into a clearance between the table and the upper surface of the protrusion. The construction in which the protrusion is offset downwards allows the cover to extend nearby the center of the slider or the mount without changing the construction of the table or its associated parts, thereby contributing to the much extension of area that may be shielded with the cover. Preferably, the linear scale of the sensing means is also shielded with the cover.

With the slider unit of the present invention constructed as described above, the moving-coil linear motor may be installed simply in the linear motion guide unit having the track rail and slider, with compactness in construction, rather than requiring much area and height. The slider unit of the present invention also succeeds in rendering simple and easy the mount of a work and the adaptation to the appliances in diverse industrial fields. Consequently, the slider unit of the present invention is most preferable to continue keeping the work on the desired position and posture on processing and conveying of the work in semiconductor/liquid crystal display manufacturing apparatus, measuring instruments, assembling machines, machine tools, industrial robots, testing instruments, conveyors and others.

DETAILED DESCRIPTION OF THE PREFERRED EMBODIMENTS

Preferred embodiments of a slider unit according to the present invention will be explained hereinafter in detail with reference to the accompanying drawings. The phraseology or terminology concerning relative locations, such as "top face", "top surface", "bottom surface", "lower surface" etc., employed hereinafter is described on the assumption that the linear motion guide unit is in the posture shown in the drawings. It is to be thus understood that those words do not limit any of other postures including turning upside down and lying on its side, where the linear motion guide unit has been practiced.

Figure 1:
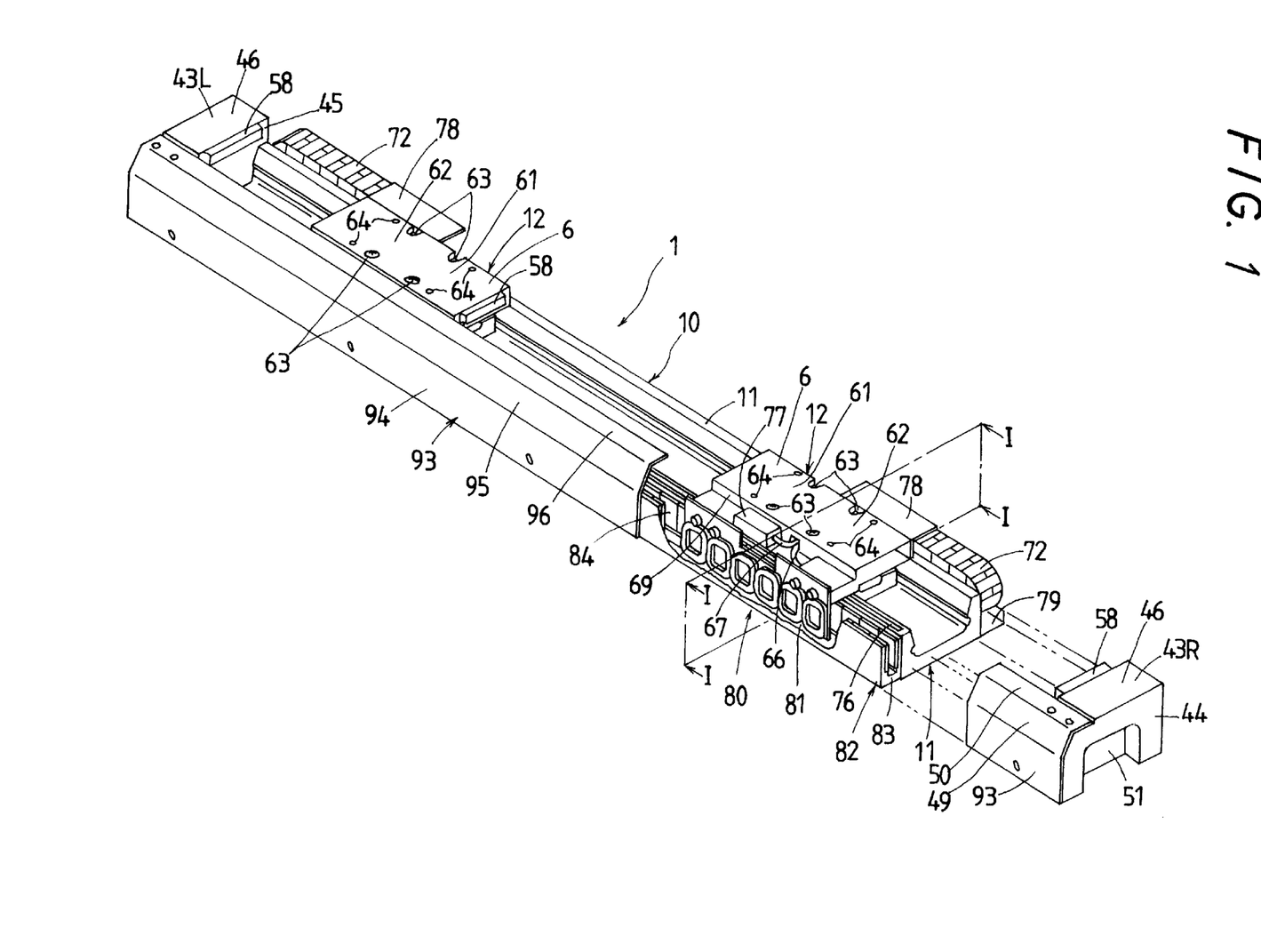
FIG. 1 is a perspective view, partially broken away and exploded, showing a preferred embodiment of a slider unit in accordance with the present invention.
Figure 2:
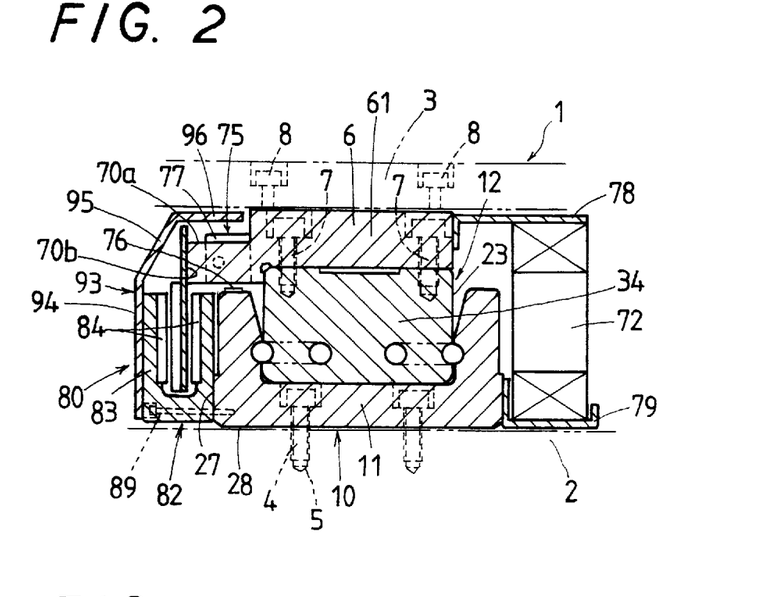
FIG. 2 is a cross-sectional view of the slider unit shown in FIG. 1, taken along the plane I—I of FIG. 1.

Referring first to FIGS. 1 and 2, a slider unit 1 is interposed between a stationary bed 2 and a table 3 to move the table 3 relatively to the bed 2. The slider unit 1 is mainly comprised of a linear motion guide unit 10 composed of an elongated track rail 11 and a slider 12 fitted in the elongated track rail 11 for freely sliding movement lengthwise along the track rail 11, and a moving-coil linear motor 80 to make the slider 12 move along the track rail 11 of the linear motion guide unit 10, thus causing the relative linear movement between the bed 2 and the table 3.

The track rail 11 is mounted to the bed 2 with fixing bolts 4 while the slider 12 is attached to a mount 6 with fixing bolts 7, to which the table 3 is also secured with fixing bolts 8. Although but two sliders 12 are shown on the track rail 11 in the illustrative example in FIG. 1, it will be appreciated that any number of the slider may be arranged for the track rail 12 in accordance with the necessity. Moreover, the slider 12, although illustrated fixed to the separate mount 6, may be made integrally with the mount 6.

As seen in FIGS. 3 to 6, the track rail 11 is composed of a pair of widthwise opposing elongated walls 13 and a bottom 13 connecting the elongated side walls 13 at their lower edges with each other. The elongated side walls 13, in combination with the bottom 14, define an elongated recess 15 of U-shape in cross section to provide a guide way along which the slider 12 is allowed to move linearly by virtue of linear motion rolling guide mechanisms, which are arranged between the slider 12 and the track rail 11 as will be described in detail hereinafter. The track rail 11 has first raceway grooves 17 that are made on opposing inside surfaces 16 of the elongated side walls 13, each to each wall, in such as manner as to extend lengthwise of the track rail in opposition to each other, along which rolling elements, or balls 30, installed in the linear motion rolling guide mechanisms are allowed to run smoothly. The track rail 11 is made at the bottom 14 thereof with holes 19 arranged spaced in two rows. The fixing bolts 4 fit into threaded holes 5 in the bed 2 through the holes 19 to hold securely the track rail 11 to the bed 2.

The track rail 11, as made in the U-shape in cross section, has so large secondary moment in cross section as to enhance remarkably the stiffness resisting against bending and twisting, which will be caused owing to the movement of the slider 12, compared with, for example, usual track rails such as solid rods. This U-shaped track rail 11 thus makes it possible to employ any supporting construction of either cantilever mode where the track rail 11 is supported at only one lengthwise end thereof or bridge mode where the track rail 11 is supported at both lengthwise opposing ends thereof, besides most common supporting construction in which the track rail 11 is supported throughout the bottom thereof. Moreover, this type of the track rail 11 may be used as any structural member of the machinery or apparatus in which the slider unit 1 is applied. The track rail 11 is made reduced as low as possible in height to render compact the linear motion guide unit 10. In addition, the track rail 11 is finish-machined with precision at the outside surfaces of the side walls 13 and the lower surface of the bottom 14 to provide a mounting surface 27 for a linear motor and another mounting surface 28 to the bed 2, respectively, which extend in parallel with the moving direction of the slider 12.

The slider 12, as shown in FIGS. 2 to 6, is comprised of a casing 20 mostly accommodated in the recess 15 of the track rail 11, end caps 21 arranged on the lengthwise opposing ends of the casing 20, each to each end, and end seals 22 attached on the end caps 21, each to each cap, to seal clearances between the track rail 11 and the end caps 21. The end caps 21 and end seals 22 are tightened to the casing 20 by means of machine screws 25.

The casing 20 for the slider 12 is made in the form of a substantially rectangular parallelepiped having a width that may be nested snugly in the track rail 11. The casing 20 is made as reduced as possible in height likewise with the track rail 11. Especially, it is to be noted that a slider head 50 on the casing 20 is normally permitted to protrude by a height D (in FIG. 4) of about 5 mm, at most equal and less than 10 mm above the top faces 18 of the side walls 13 of the track rail 11. That is, the casing 20 has to be constructed such that the height D above the top faces 18 of the trackrail 11 is made as small as possible in order to render compact or slim the linear motion guide unit 1 in which the slider 12 in incorporated into the track rail 11.

Formed on widthwise opposing side surfaces 23 of the casing 20 are second raceway grooves 24, each of which confronts the associated one of the first raceway grooves 17 formed on the inside surfaces 16 of the track rail 11 to define a loaded raceway 31 between them, through which rolling elements or balls 31 are allowed to run whereby the slider 12 may move smoothly along the track rail 11.

The rolling elements, or balls 30, are incorporated in the slider 12 in such a manner as to run through endless circulating paths, which are composed of load areas of raceways 31 defined between the confronting raceway grooves 17, 24 and non-loaded areas of return tunnels 32 bored in the casing 20 and turnarounds, not shown, formed in the end caps 21 to allow the balls 30 to return to the load areas. It will be thus understood that the endless circulating paths including the loaded raceways 31, in combination with the balls 30, provide linear motion guiding mechanisms to allow the slider 12 to move in sliding manner along the track rail 11. The balls 30 running in a row on each of the widthwise opposing side surfaces of the slider 12 are balls comparatively large in diameter, and come in contact at their vertically opposing points with the raceway grooves 17 in the track rail 11 when observed on microscopic scales. Thus, the slider 12 is kept in contact with the track rail 11 at four linear areas so that the linear motion guide unit 10 may ensure steady high accuracy and rigidity even in applications plagued with complex loads or loads variable in magnitude and direction.

The slider 12 has a grease nipple 35 for applying lubricant to the endless circulating paths, which is attached to any one of the end caps 21 so as to extend outside from the associated end seal 22. A plug 36 is attached to the other end cap 21 to keep lubricant from leakage. Arranged on the loaded raceways 31 are upper seals 33, shown in FIG. 5, to cover clearances between the casing 12 and the track rail 11 for protecting the loaded raceways 31 against foreign matter such as dust and dirt.

At least any one of widthwise opposing side surfaces of the slider head 34 provides a reference side surface 37 for mounting, which is accurately finished in a plane extending in parallel with the moving direction of the slider 12. As an alternative, any one of the widthwise opposing side surfaces of the slider head 34, which have been finished in advance, may provide the reference side surface 37 for mounting. A top surface of the slider head 34 is partly made to provide a reference top surface 38 for mounting, on which is attached the mount 6. The reference side surface 37 and the reference top surface 38 for mounting are formed in straight planes that are normal to each other.

Figure 7:
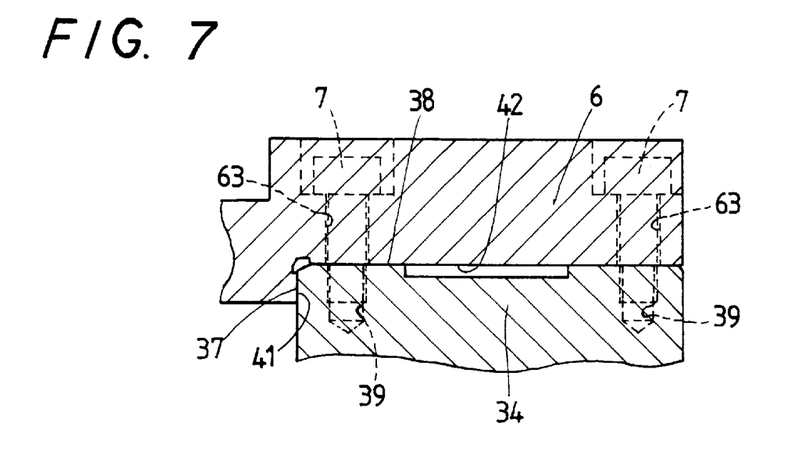
FIG. 7 is fragmentary sectioned view showing a connecting construction of a mount with a slider used for the linear motion guide unit shown in FIG. 3.
Figure 8:
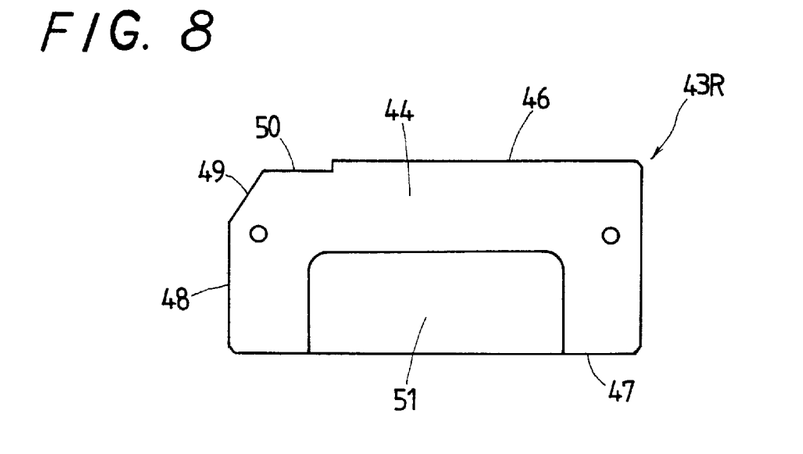
FIG. 8 is a front elevation of an end block to be used in the slider unit shown in FIG. 1.
Figure 9:
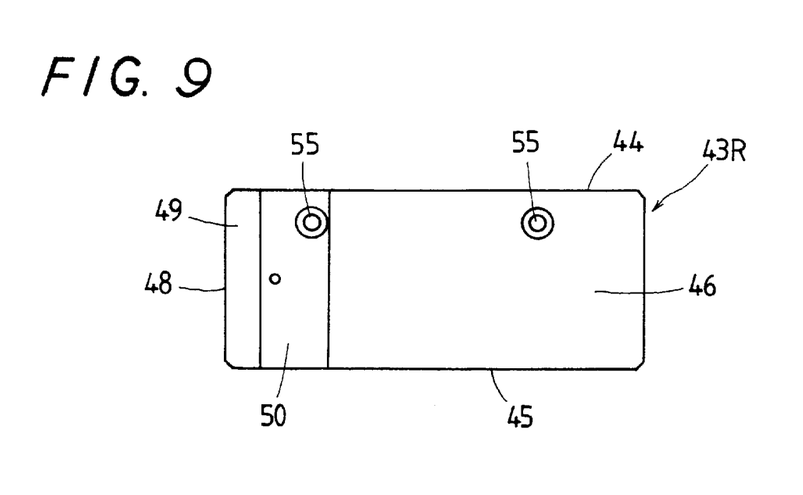
FIG. 9 is a top plan view of the end block shown in FIG. 8.
Figure 10:
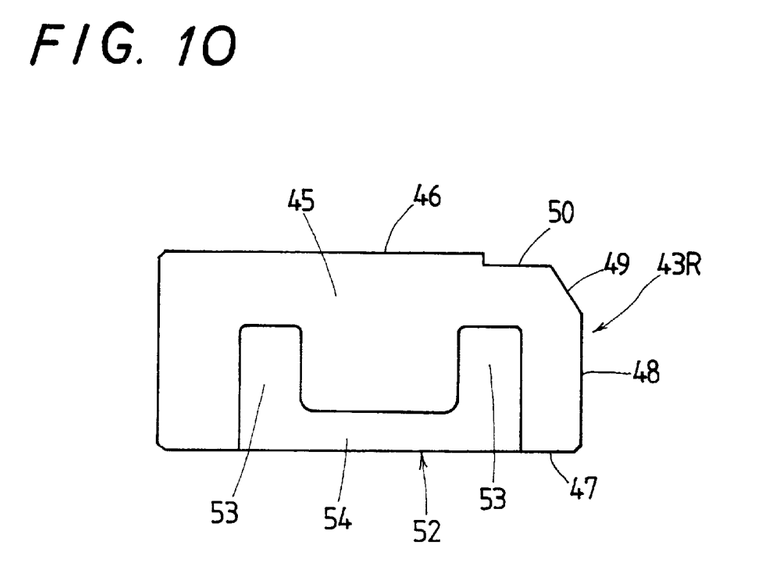
FIG. 10 is a rear elevation of the end block shown in FIG. 8.
Figure 11:
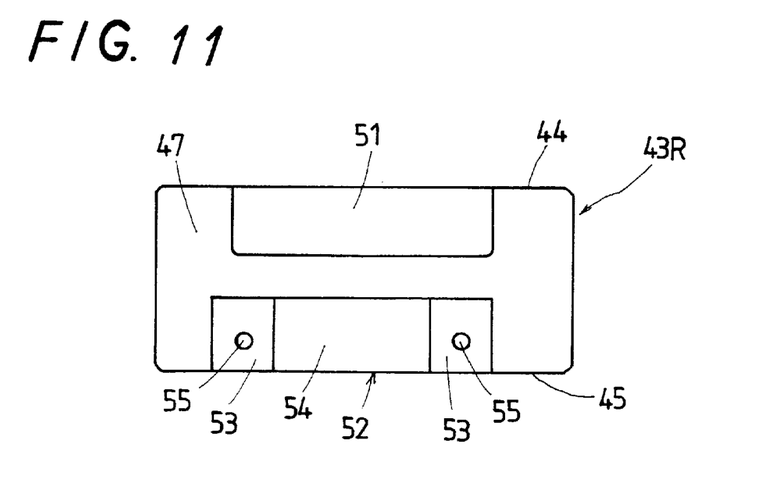
FIG. 11 is a bottom plan view of the end block shown in FIG. 8.

Referring to FIG. 7 showing in detail the mounting construction of the mount 6 onto the slider head 34, the mount 6 is provided with a mounting side surface 41 and a mounting bottom surface 42, which are arranged in perpendicular to each other to provide a stepped surface. On setting the mount 6 on the slider 12, the mounting side surface 41 of the mount 6 comes in abutment against the reference side surface 37 of the slider 12 while the mounting bottom surface 42 is abutted against the reference top surface 38. The reference side surface 37 for mounting of the slider 12 is the raised straight plane having the amount of height D within the range from 5 mm to 10 mm, which has substantially over its entire area the stiffness or rigidity enough to withstand the abutment against the associated mounting side surface 41. Thus, the mount 6 is set on the slider 12, with kept surely in widthwise position and posture. The mount 6 is also constrained in its vertical position and posture by coming in abutment at its mounting bottom surface 42 against the reference top surface 38 for mounting of the slider 12.

Figure 3:
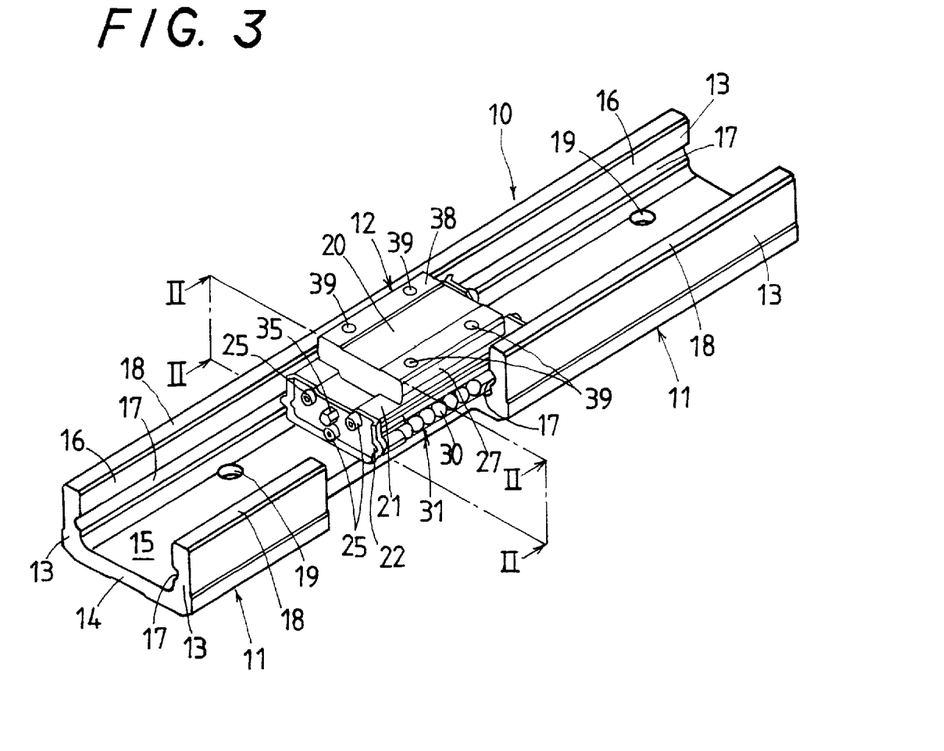
FIG. 3 is a perspective view, partially broken away, showing a linear motion guide unit employed in the slider unit shown in FIG. 1.
Figure 4:
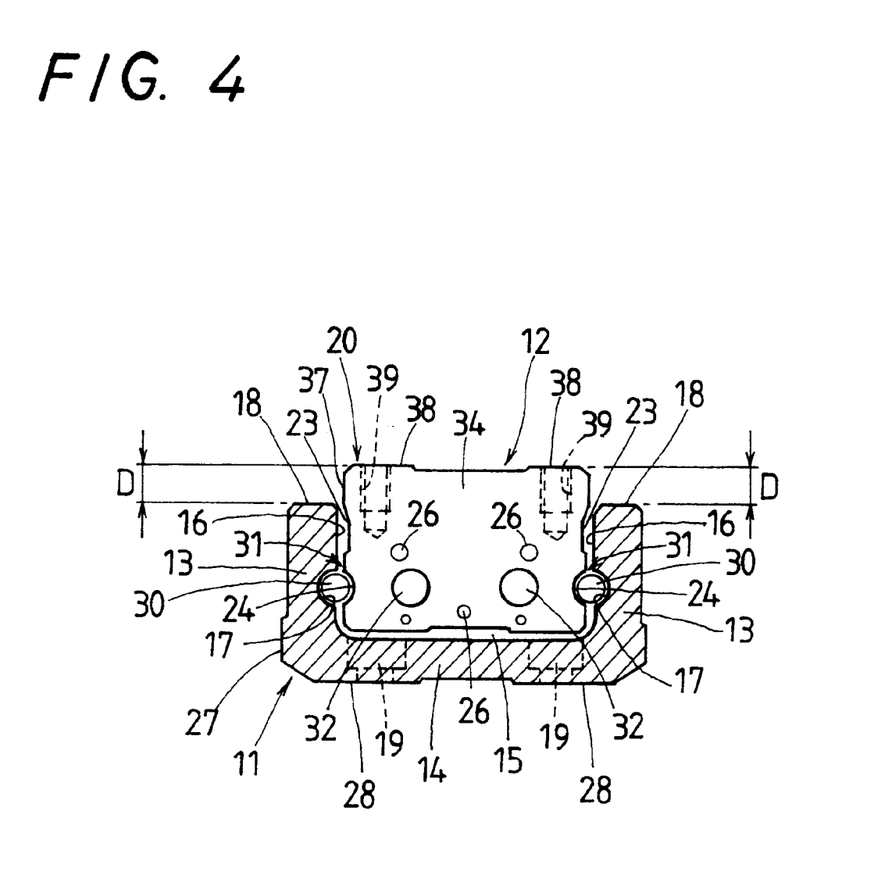
FIG. 4 is a cross section of the linear motion guide unit, taken along the plane II—II of FIG. 3.
Figure 5:
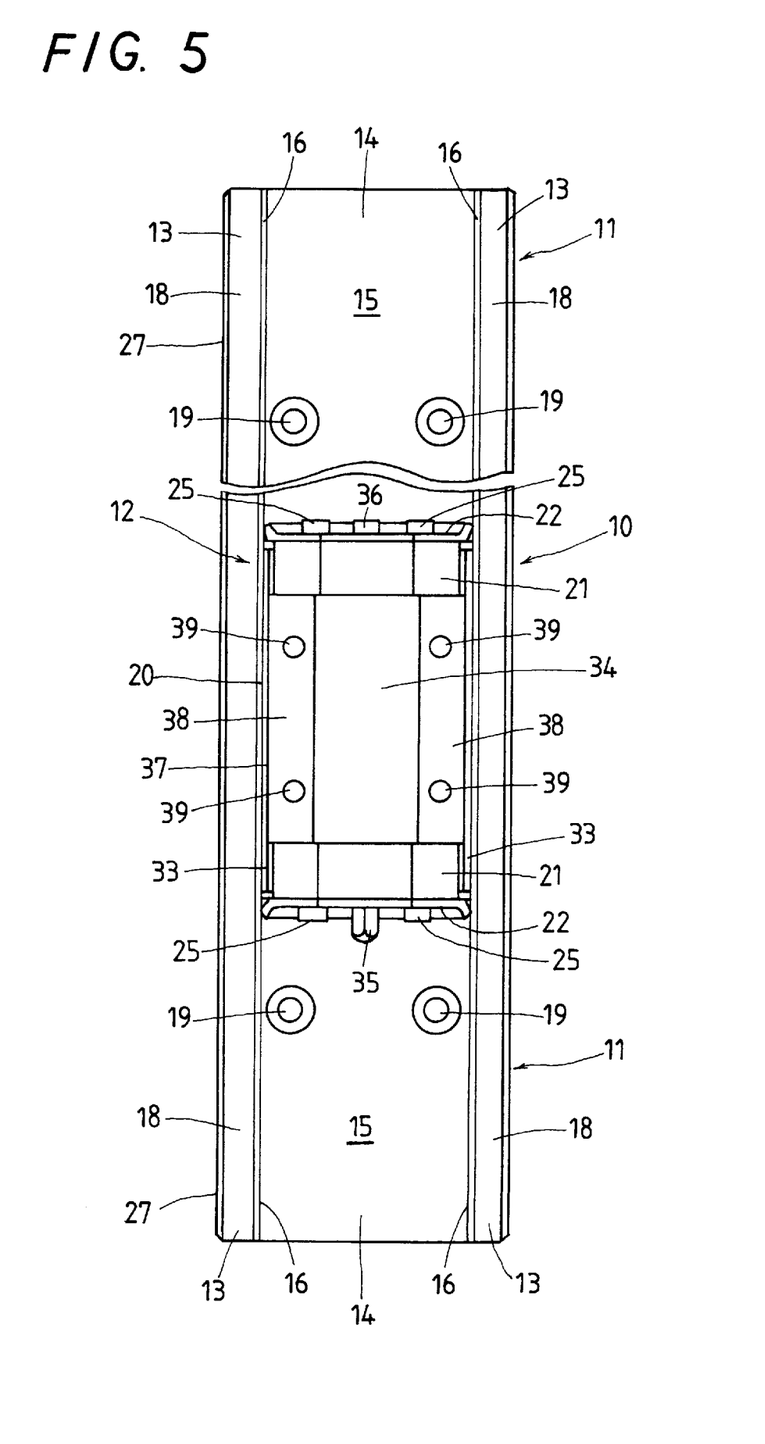
FIG. 5 is a top plan view of the linear motion guide unit shown in FIG. 3.
Figure 6:
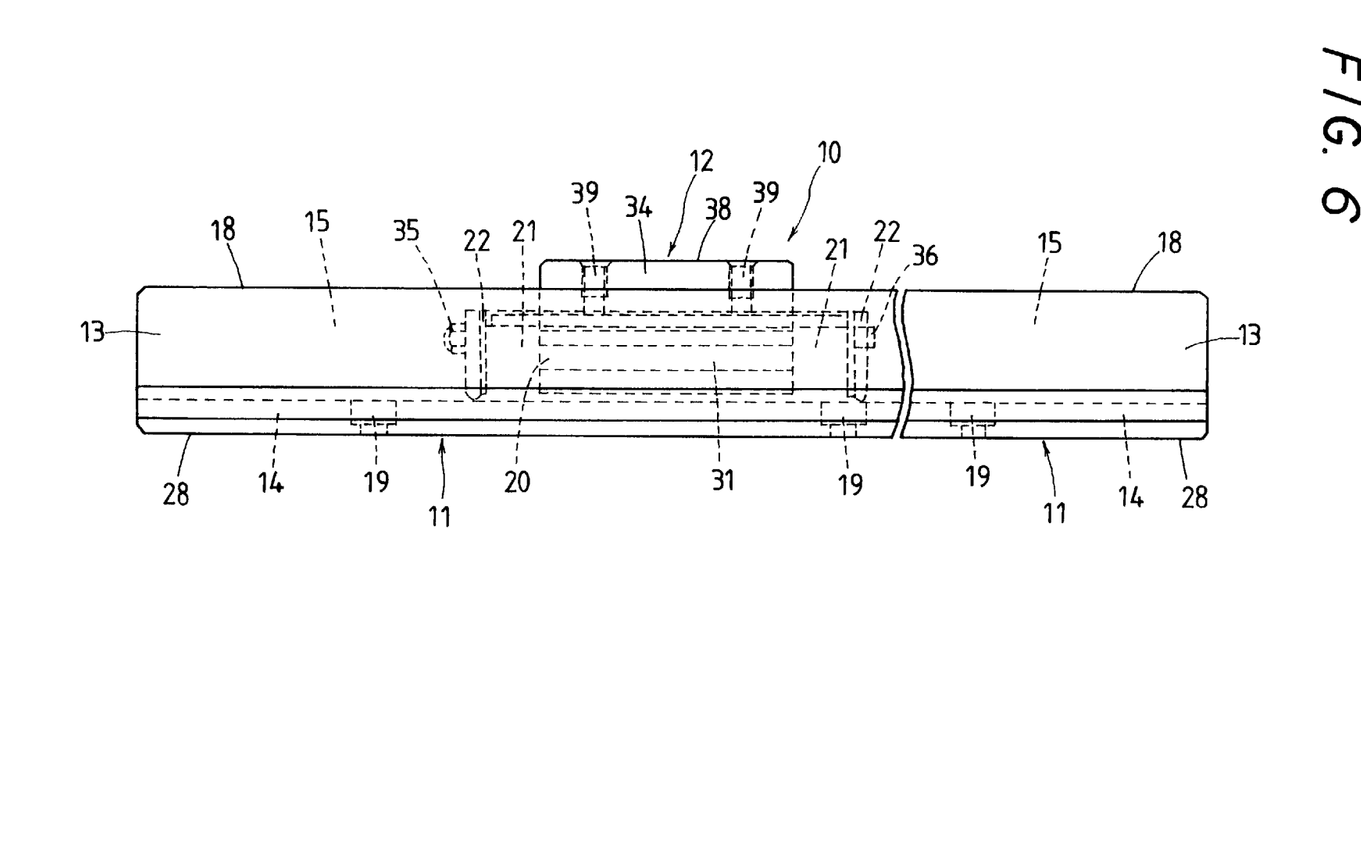
FIG. 6 is a side elevation of the linear motion guide unit shown in FIG. 3.

Following the determination of position and posture, the mount 6 is secured to the slider 12 by means of the fixing bolts 7, which fit into a set of four threaded holes 39, refer to FIG. 3, bored in the reference top surface 38 of the slider 12, through a set of four fixing holes 63, refer to FIG. 1, of the mount 6. As the reference side surface 37 for mounting of the slider 12 is made in parallel with the mounting surface 27 of the track rail 11, on which is attached the linear motor, the mount 6 may be arranged with accuracy along the mounting surface 27 to the linear motor. The table 3 is mounted with the fixing bolts 8 on the mount 6 combined with the slider 12.

End blocks 43L, 43R are attached to the lengthwise opposing ends of the track rail 11, each to each end, by fixing means such as fixing bolts as shown in FIG. 1 to protect the guide way from foreign matter, dust and dirt and the like. Although FIGS. 8 to 11 show only the end block 43R at the right-hand end of the slider unit 1 in FIG. 1, the left-hand end block 43L is symmetric in structure with the right-hand end block 43R and therefore either of right-hand and left-hand blocks are commonly denoted by 43 in the following description. The end block 43 has a recess 51 opened downwards to a lower surface 47 at the outermost end face 44. An operator may easily lift or carry the slider unit 1 by putting his hands on both the opposing recesses 51.

The end block 43 has an inside end face 45 on the side of the track rail 11, which is formed in a concavity 52 of U-shape for accommodating therein any one of the lengthwise ends of the track rail 11. The concavity 52 is composed of a pair of widthwise opposing side depressions 53 in conformity with the side walls 13 of the track rail 11 so as to receive therein the side walls 13, and a bottom depression 54 opening to the lower surface 47 and connecting the side depressions 13 to one another to receive the bottom 14 of the track rail 11. By means of fixing bolts screwed into the side walls 13 of the track rail 11 through matching holes 55 bored in an upper surface 46 of the end block 43, the track rail 11 is attached to the end block 43, with the end of the track rail 11 being held in the concavity 52 in the associated end block 43. Moreover, a step 50 and a slant 49 for a cover 93 described below are formed at the crossing area of the upper surface 48 with any one of side surfaces 46 of the end block 43.

Stoppers 58 of elastic body such as synthetic rubber are arranged on the inside end faces 45 of the end blocks 43, each to each inside end face, to provide buffers for protecting the slider 12 from a collision against the end block 43. In case plural sliders 12 are arranged on one track rail 11, another similar stopper 58 is moreover arranged on either one of the confronting ends of the sliders 12 or the mounts 6, which might come in possible collision with one another.

As shown in FIGS. 1 and 2, the linear motor 80 to drive the slider 12 with respect to the track rail 11 is arranged on any one of the widthwise opposing sides of the mount 6, which is fixed on the reference top surface 38 for mounting of the slider 12.

Figure 12:
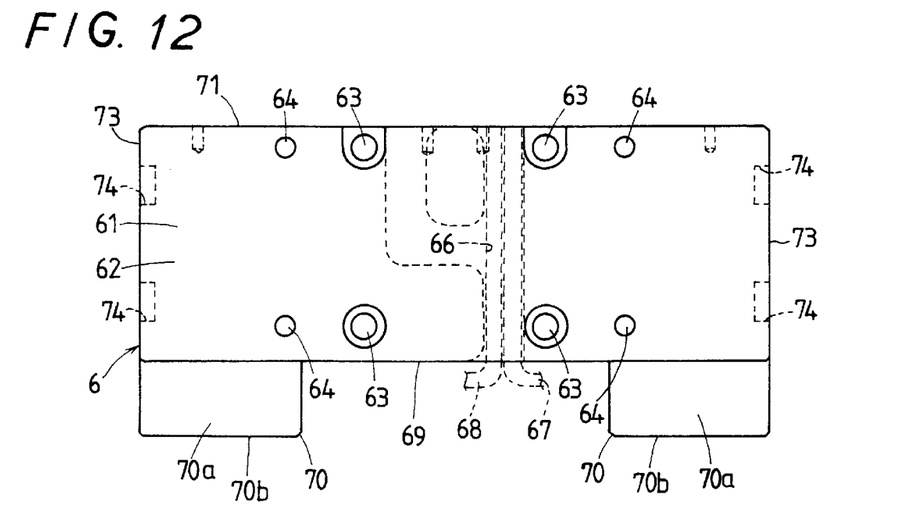
FIG. 12 is a top plan view of the mount used in the slider unit in FIG. 1.
Figure 13:
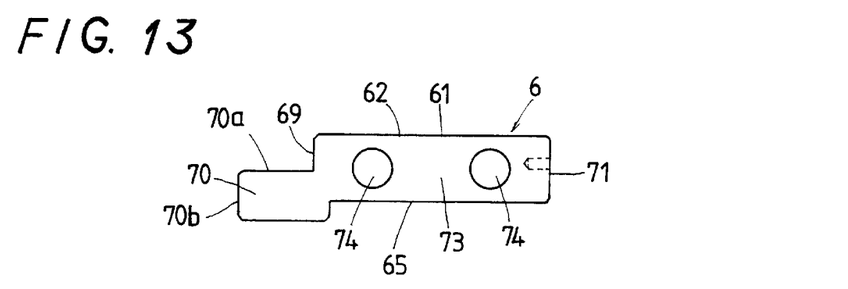
FIG. 13 is a front elevation of the mount used in the slider unit shown in FIG. 1.
Figure 14:
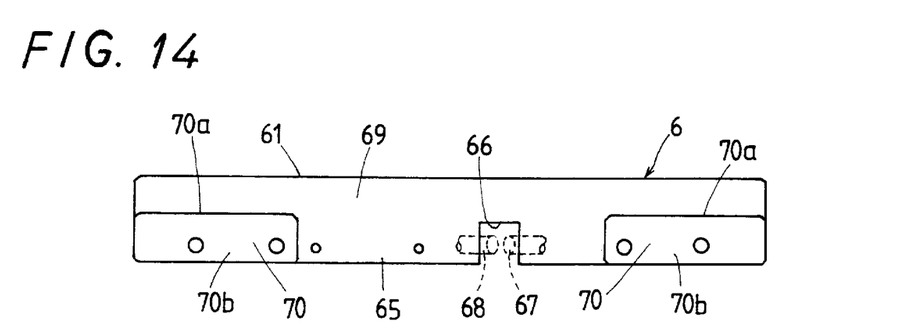
FIG. 14 is a side elevation of the mount in FIG. 1.

The mount 6 will be explained below in detail with reference to FIGS. 12 to 14. The mount 6 includes a mount body 61 coming in direct contact with the top surface 38 of the slider 12. A work is secured on an upper surface 62 of the mount body 61, which is provided with the fixing holes 63 through which the fixing bolts 7 pass to secure the mount 6 on the slider 12, and further bored with four threaded holes 64 opened to the upper surface 62, into which is screwed bolts to fix the table 3 onto the mount 6.

The mount body 61 is provided at a lower surface 65 thereof with a channel 66 extending across the widthwise opposing sides of the mount body 61 to lead power lines 67 and sensor cords 68 from either one of the widthwise opposing sides to another. The mount body 61 has a pair of stepped protrusions 70 that extend sidewise integrally from any one side edge 69 of the mount body 61 to hold thereon a moving-coil assembly 81 corresponding to the movable part of the linear motor 80. Attached on the side edge 69 a sensor head 77 of sensing means 75 is at an area between the stepped protrusions 70 while on another side edge 71 opposite to the side edge 69 there is affixed through a fixture 78, refer to FIG. 2, an end of a cable bearer 72 that may follow curvedly the movement of the slider 12 to protect the power lines 67 and sensor cords 68 along the outside surface of the associated side wall. Another end, not shown, of the cable bearer 72 is connected to another fixture 79, refer to FIG. 2, secured to the track rail 11. Moreover, the mount body 61 is provided on fore-and-aft ends 73 thereof with paired holes 74 to secure the stopper 58 thereto.

For accurately learning of the relative position of the slider 12 to the track rail 11, there is provided sensing means 75 for monitoring information as to the position of the slider 12 with respect to the track rail 11. The sensing means 75 is composed of a linear scale 76, or a photo-linear scale, extending lengthwise on a top face 18 of the track rail 11 over the substantially entire length of the track rail 11, and a sensor head 77, or an optical sensor head, arranged on the mount 6 in opposition to the linear scale 76. Instead of optical type, the linear scale may be of magnetic type. The sensor head 77 is connected to the sensor cord 68 in the channel 66 of the mount body 61 to signal information on the linear scale 76 to a control unit, not shown, through wiring or cable bearer in the mount 6.

The control unit operates to supply an electric power to the moving-coil assembly 81 through the power line 67 in accordance with the information about the position applied through the sensor cord 68, thereby driving the linear motor to govern the position and linear motion of the slider 12. The elongated linear scale 76 is provided with an adequate origin mark. The sensing means to monitor the information regarding the relative position of the slider to the table is placed nearby the central area of the table moving relatively of the bed and, therefore, is less subject to the adverse influence of changes in position such as pitching, yawing and rolling as the table moves, so that the accurate sensing control may be accomplished. In addition, as the sensor head is arranged nearby a moving-coil assembly, the wiring for the sensing means may be neatly arranged in a slim area.

The linear motor 80 is built in the slider unit 1 in such a construction that the moving-coil assembly 81 of the linear motor 80 is attached to the stepped protrusions 70 extending sidewise out of the side edge 69 of the mount body 61. Next, referring to FIGS. 15 and 16 showing a stator 82 of the linear motor 80, the stator 82 is composed of a magnet yoke 83 integrally formed in U-shape in section crossing the moving direction of the slider 12, the magnet yoke 83 being fixed on the mounting surface 27 of the track rail 11 so as to extend along the overall length of the track rail 11 thereby forming a stationary part of the linear motor 80, and field magnets 84 supported on the magnet yoke 83.

Figure 15:
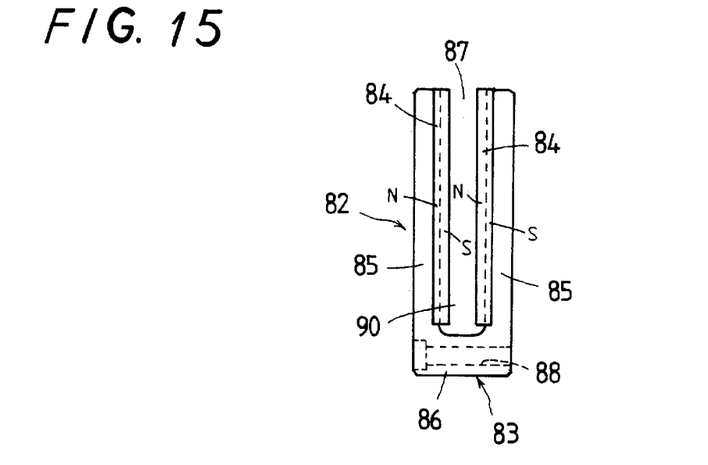
FIG. 15 is a side elevation illustrating a stator of a moving-coil linear motor incorporated in the slider unit shown in FIG. 1.
Figure 16:
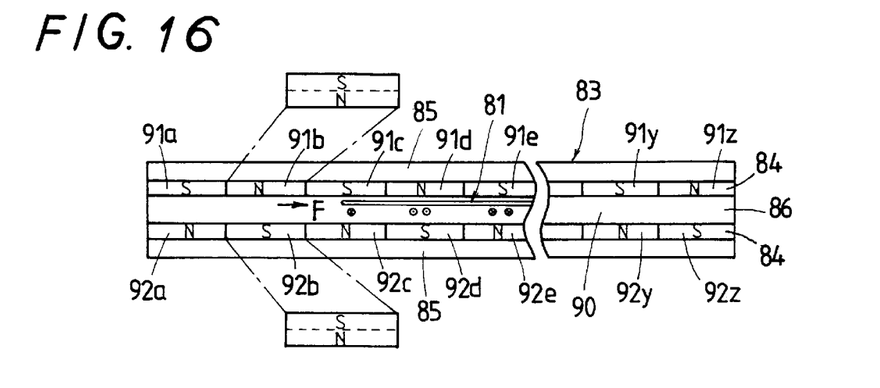
FIG. 16 is a schematic top plan view of the moving-coil linear motor.

As seen in FIG. 15, the magnet yoke 83 is comprised of a pair of webs 85, 85 arranged in confronting relation to each other to provided between them an elongated clearance or gap 32, and a connecting web 86 interconnecting integrally the confronting webs 85, 85. The integral construction of the magnet yoke 83 helps ensure keeping entirely much stiffness or rigidity, irrespective of the magnet yoke 83 being slit upward at 87 along the lengthwise direction of the track rail 11. Thus, the magnet yoke 83 may be made considerably thin in thickness. This makes it possible to provide such slider unit 1 that is made compact or slim in widthwise direction thereof with less subject to the deflection owing to the magnetic attraction, which might cause any trouble in operation of the linear motor. The magnet yoke 83 is divided lengthwise into sections of preselected length and secured to the track rail 11 with machine screws 89, refer to FIG. 2, which pass through widthwise holes 88 made in the connecting web 86.

The field magnets 84, 84 in the form of sheet are arranged on the inwardly opposing surfaces of the confronting webs 85, 85 of the magnet yoke 83. As shown in FIG. 16, the field magnets 84, 84 are composed of thin magnet pieces 91a, 91b, . . . , 92a, 92b, . . . , which are closely placed side by side in such a relation that unlike poles oppose directly to each other across the air gap 90. The magnet pieces are made of thin rectangular solids that are magnetized in the direction of thickness, and arranged such that the poles on either piece alternate in polarity lengthwise along the track rail 11. The end blocks 43 close the lengthwise opposing ends of the field magnets 84, 84 to keep them from the foreign matter invasion owing to the magnetic attraction.

Since the sensing means 75 is built in the slider unit 1 and further entirely shielded with the cover 93, there is no part projecting outside the slider unit 1. This makes the slider unit 1 compact in construction and trimmed in appearance, and further allows the slider unit 1 to operate, in practice, with less interference with other peripheral instruments. The sensing means 75 is placed near the central area along the sliding direction of the slider 12 and therefore is less subject to the adverse influence of changes in position or posture such as pitching, yawing and rolling as the table moves, so that the accurate sensing control may be accomplished. In addition, as the sensor head 77 is arranged nearby a moving-coil assembly 81, the wiring for the sensing means may be neatly arranged in a slim area.

The cover 93 is formed of a side panel 94 to shield the outer surface of the magnet yoke 83, and an inclined panel 95 combined with a ceiling panel 96 to conceal the side 48, slant 49 and step 50 of the end blocks 43. The side panel 94 is attached to the magnet yoke 83 while the ceiling panel 96 is fixed to the end blocks 43. The cover 93 over the linear motor 80 and linear scale 76 keeps the sensing means 75 from the fear of breakage. The stepped protrusions 70 of the mount 6 are offset downward such that their upper surfaces 70a are depressed below the major upper surface 62 of the mount 6. This allows the ceiling panel 96 of the cover 93 to extend into a clearance between the bottom surface of the table 3 and the upper surfaces 70a of the stepped protrusions 70, thereby shielding the linear scale 76 and sensor head 77.

Figure 17:
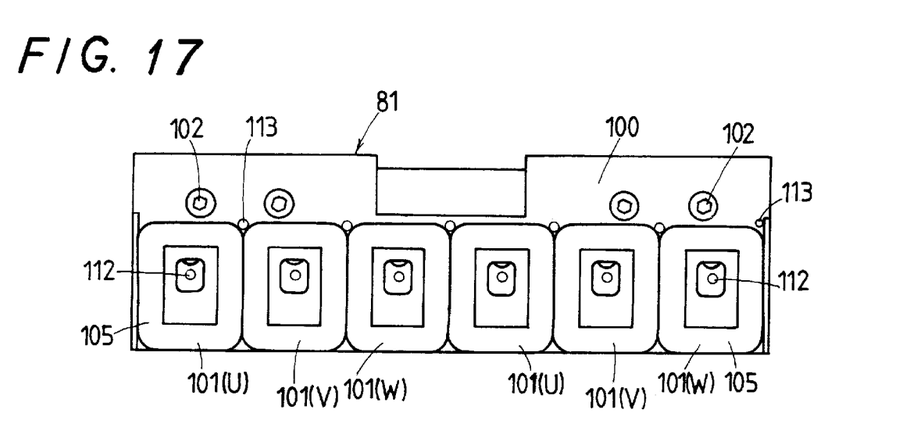
FIG. 17 is a schematic illustration of a moving-coil assembly of the moving-coil linear motor used in the slider unit of FIG. 1.

The moving-coil assembly 81 is secured with fixing screws 102 on sidewise edges 70b of the stepped protrusions 70 of the mount 6 and comprises, as shown in FIG. 17, a coil board 100 arranged in the air gap 90 through the elongated opening 87 in the magnet yoke 83, and a moving element of polyphase armature coils 101 mounted to the coil board 100. The armature coils 101 are made in the form of three-phase coreless coils. Thus, six or nine armature coils 42, which are a multiple of three, are arranged closely in a row. Each armature coil 101 is made of winding turns looped around a hollow core in a plane parallel with that of the coil board 100 in the form of rectangle. As an alternative, the armature coil 101 may be made of turns molded with resinous material as will be below.

The coil board 100 and armature coils 101 held on the coil board 100 will be explained below in detail with reference to FIGS. 18 to 20. The coil board 100, as apparent from FIG. 20 showing a top plane thereof, has a row of holes 103 where fixing screws 102 fit to hold the coil board 100 on the mount 6. Also formed on the coil board 100 are six pairs of recesses 104 arranged spaced at regular intervals along the lengthwise direction thereof in order to place in preselected position the six armature coils 101. As an alternative, holes or perforations may be provided instead of the recesses 104.

Figure 18:
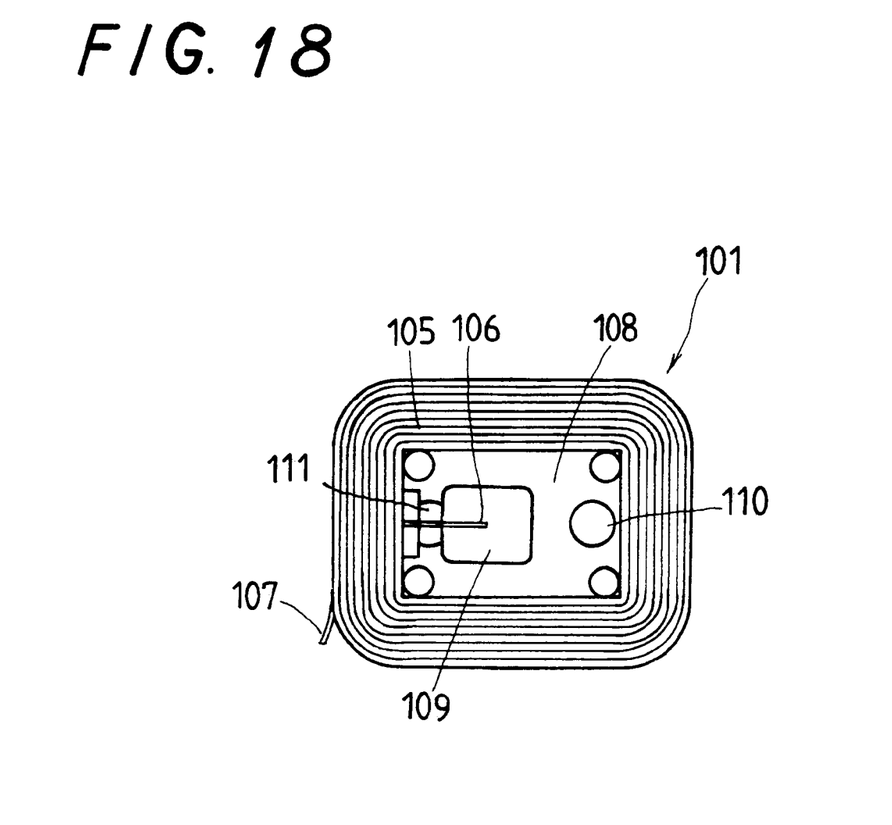
FIG. 18 is a top plan view showing an armature coil used in the moving-coil assembly of FIG. 17.
Figure 19:
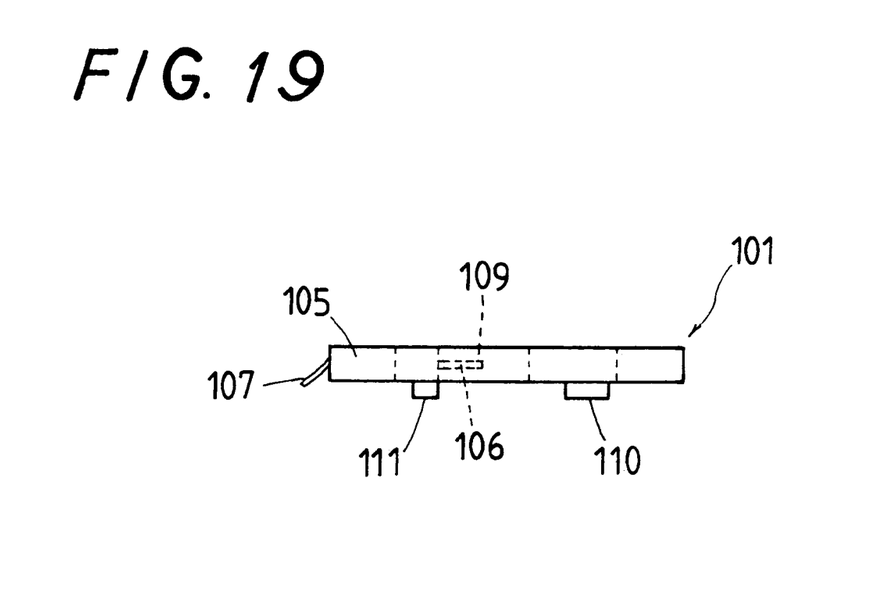
FIG. 19 is a side elevation of the armature coil shown in FIG. 18.
Figure 20:
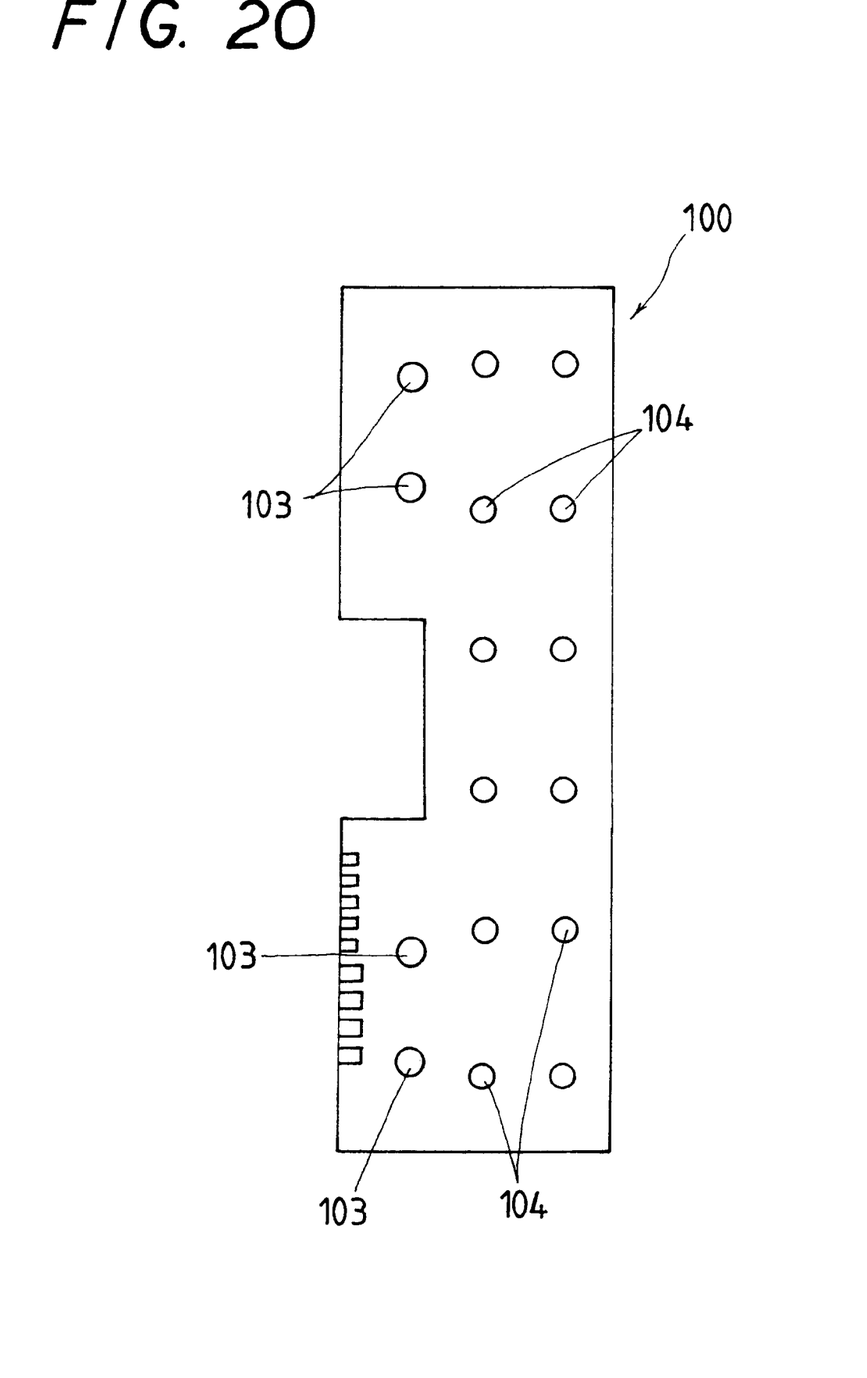
FIG. 20 is a top plan view of a coil board used in the moving-coil assembly of FIG. 17.

As seen from FIGS. 18 and 19, the armature coil 101 comprises a core member 108 of molded resinous material, and winding turns 105 looped around the core member 108 in the form of flat rectangular solid. The core member 108 is made with an aperture 109 through which any one end 106 of the winding turns 105 is led out for wiring connection, and also provided with a pair of convexities 110, 111 on a surface thereof facing the coil board 100. The convexity 110 has a round contour conformable to each recess 104 formed on the coil board 100, whereas another convexity 111 has an appearance resembling partly with the former convexity 110. Fitting the convexities 110, 111 in the associated recess 104 in the coil board 100 ensures fastening the armature coil 101 to the coil board 100 with no fear of causing the out-of-place even under high-speed operation of the table 3. The armature coil 101, though adhered to the coil board 100 with adhesive, is molded with resinous material and, therefore, is less subject to deformation due to high temperature. This results in improving the structural strength of the armature coil 101, thereby allowing higher-speed of operation than any other prior slider units. The one end 106 of the winding turns 105 is connected to each associated terminal 112 on the coil board 100, whereas another end 107 led out of the winding turns 105 is connected to any one of other terminals 113 on the coil board 100, as shown in FIG. 17.

The magnetic flux created by the field magnets 84, 84 is allowed to pass through the magnet yoke 83 and across the air gap 90 in perpendicular to pole-faces of the confronting field magnets 84, 84. The armature coils 101 are, as shown in FIG. 16, arranged in the air gap 90 between the confronting field magnets 84, 84, with the direction of the winding turns of the armature coils 101 crossing at right angles across the magnetic flux existing in the air gap 90 between the confronting field magnets 84, 84. When the armature coils 101 carry current, a mechanical force F in accord to Fleming's left-hand law is exerted upon the coil magnets 101 lengthwise of the magnet yoke 83, so that the slider 12 supporting the coil magnets 101 is forced along the lengthwise direction of the track rail 11. In contrast, when the current flowing through the armature coils 101 is reversed, the slider 12 is moved in the direction opposite to the arrow F. It will be understood that the slider 12 may move to the desired position by controlling the conduction to the armature coils 101.

The magnetic flux density produced across the air gap 90 by the confronting field magnets 84, 84 varies sinusoidally along the lengthwise direction of the track rail 11, because the poles on the magnet pieces 91, 92 alternate in polarity (north, south, north, south) linearly along the track rail 11. Each armature coil 101 carries any one of three-phase currents denoted by reference letters U, V and W in FIG. 17, which have the same magnitude but are out of phase, and alternate sinusoidally with the magnetic flux direction depending on the positions of the associated armature coil 101 along the coordinate axis. Thus, each armature coil 101 conducting any one of the three-phase currents is subjected to thrust force acting rightwards (in the direction of F) by virtue of Fleming's left-hand law, so that a set of the armature coils 101 or the moving-coil assembly 81 is always driven continuously in the direction of F in FIG. 16 whereby the slider 12, or the table 3, may continue to move linearly. Thus, the slider unit 1 in combination with the control unit is allowed to move freely along the lengthwise direction as well as stop moving at any desired position. As an alternative to increase the propulsion, it is preferred to provide the linear motors 80 on not only any one side but also both sides, or plural linear motors 80 are arranged in juxtaposition on any one side or both sides.

Moreover, there may be provided a limiter on the track rail 11 to define the limit of stroke of the slider 12 and an origin mark to define the origin of the slider 12. Correspondingly, a limit sensor to monitor the limiter and origin mark may be provided on either the slider 12 or the moving-coil assembly 81.

What is claimed is:

1. A slider unit with a built-in moving-coil linear motor; comprising a track rail supported on a bed and having a pair of side walls connected with one another, a slider mounted to a table to be moved with respect to the bed, the slider being movable in a lengthwise direction of the track rail in a sliding manner along a guide way defined between the side walls of the track rail, and a moving-coil linear motor providing a driving power to move the slider relatively of the track rail;

wherein the moving-coil linear motor is composed of a magnet yoke having a pair of field magnets and held on an outside surface of at least one side wall of the track rail, and a moving-coil assembly held on the slider and arranged in an air gap between the confronting field magnets to come into electromagnetic interaction with the field magnets, thereby producing a force to move the assembly along the lengthwise direction of the track rail.

2. A slider unit constructed as recited in claim 1, wherein the track rail includes a bottom interconnecting the side walls with one another to provide the guide way of U-shape in cross section, which is formed of the bottom in combination with the side walls.

3. A slider unit constructed as recited in claim 2, wherein the track rail is provided at the bottom thereof with holes in which fixing bolts fit to mount the track rail to the bed.

4. A slider unit constructed as recited in claim 1, wherein both the table and moving-coil assembly are held on a mount, which is in turn secured to the slider.

5. A slider unit constructed as recited in claim 1, wherein the slider is movable in a sliding manner along the track rail by virtue of rolling elements, which run through raceways defined between first raceway grooves made lengthwise on inwardly opposing inside surfaces of the confronting side walls of the track rail and second raceway grooves made on the slider in opposition to the first raceway grooves.

6. A slider unit constructed as recited in claim 1, wherein end blocks are arranged on lengthwise opposing ends of the track rail, each to each end, the end blocks being formed at the outermost end faces thereof with recesses for manipulation to make it possible to manually operate the slider unit.

7. A slider unit constructed as recited in claim 1, wherein the magnet yoke is comprised of a pair of confronting webs that are provided on inwardly opposing surfaces thereof with the field magnets, each to each web, and a connecting web to join the confronting webs together at their bottom sides, and wherein the magnetic yoke is secured to the track rail, with an opening between the confronting webs being upwards.

8. A slider unit constructed as recited in claim 7, wherein the field magnets are magnetized such that poleson the field magnets alternate in polarity lengthwise of the track rail and also unlike poles confront each otheracross the air gap between the field magnets.

9. A slider unit constructed as recited in claim 7, wherein the moving-coil assembly is held on either the slider extending beyond any one of the side walls of the track rail, on which the magnet yoke is secured, or a protrusion of the mount in such a relation that the assembly extends into the air gap between the confronting field magnets, following passing through the opening of the magnet yoke.

10. A slider unit constructed as recited in claim 9, wherein the moving-coil assembly is comprised of a coil board held on an edge of the protrusion and arranged in the air gap, and a polyphase armature coil arranged on the coil board, the armature coil being composed of a core member of molded resinous material and winding turns looped around the core member in the form of flat rectangular solid, and wherein the armature coil is fixed to the coil board by engagement of a convexity formed on the core member with a recess on the coil board.

11. A slider unit constructed as recited in claim 1, wherein sensing means to monitor position of the slider with respect to the track rail is comprised of a linear scale, and a sensor head to detect the linear scale, the linear scale being arranged on a top face of any one side wall of the track rail, on which the moving-coil linear motor is arranged, and sensor head is held on either the slider or the protrusion of the mount.

12. A slider unit constructed as recited in claim 1, wherein the moving-coil linear motor is shielded with a cover attached to the magnet yoke.

13. A slider unit constructed as recited in claim 12, wherein the protrusion on which the moving-coil assembly is held is offset downwards so that its upper surface is placed below an upper surface of either the slider or the mount on which the table is held, and wherein the cover extends into a clearance between the table and the upper surface of the protrusion.

* * * * *